F. E. & J. S. BRADLEY.
CULTIVATOR.
APPLICATION FILED JUNE 30, 1909.
937,760.
Patented Oct. 26, 1909.
3 SHEETS—SHEET 2.
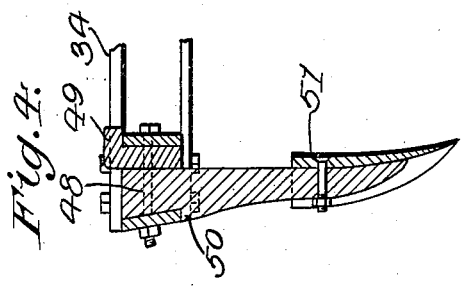
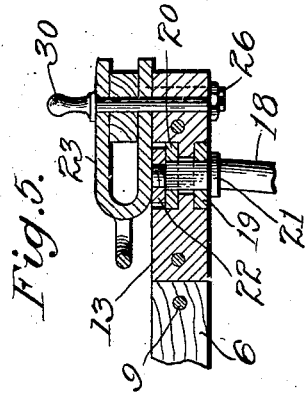
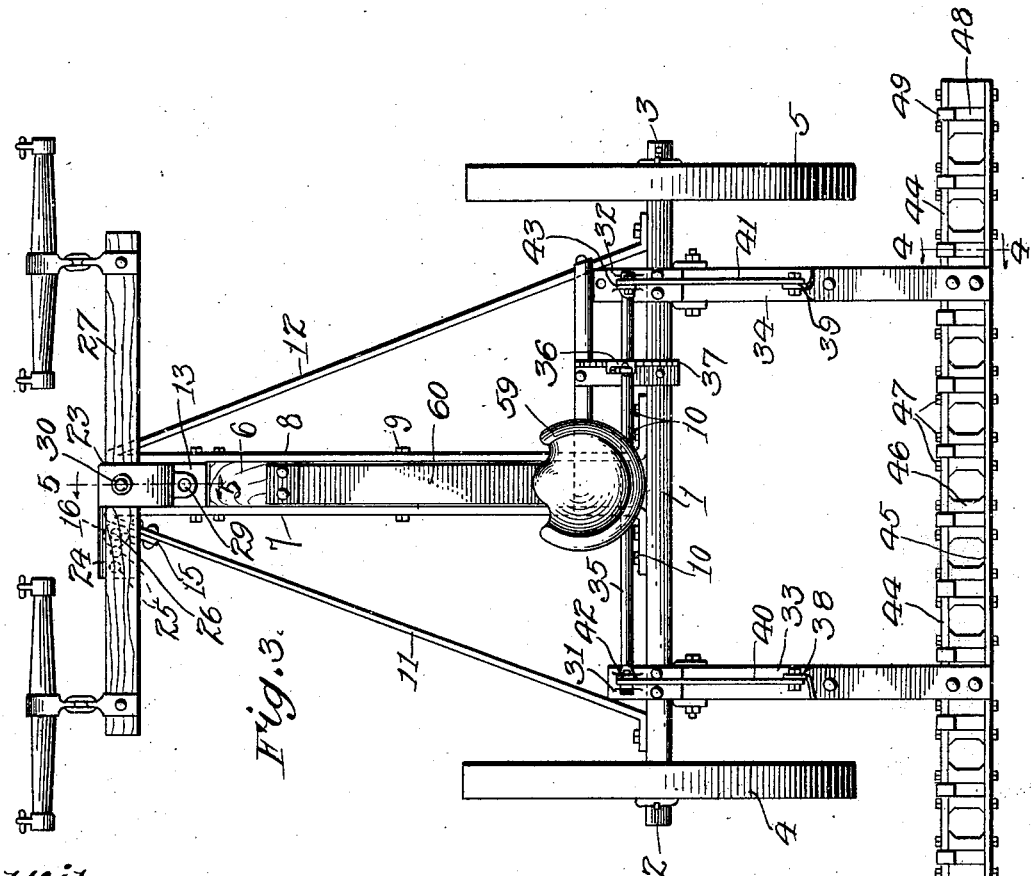
Witnesses:
C. J. Williams
Helen M. Driscoll
Inventors:
Frank E. Bradley.
John S. Bradley.
by Seiner G. Wells,
Attorney.

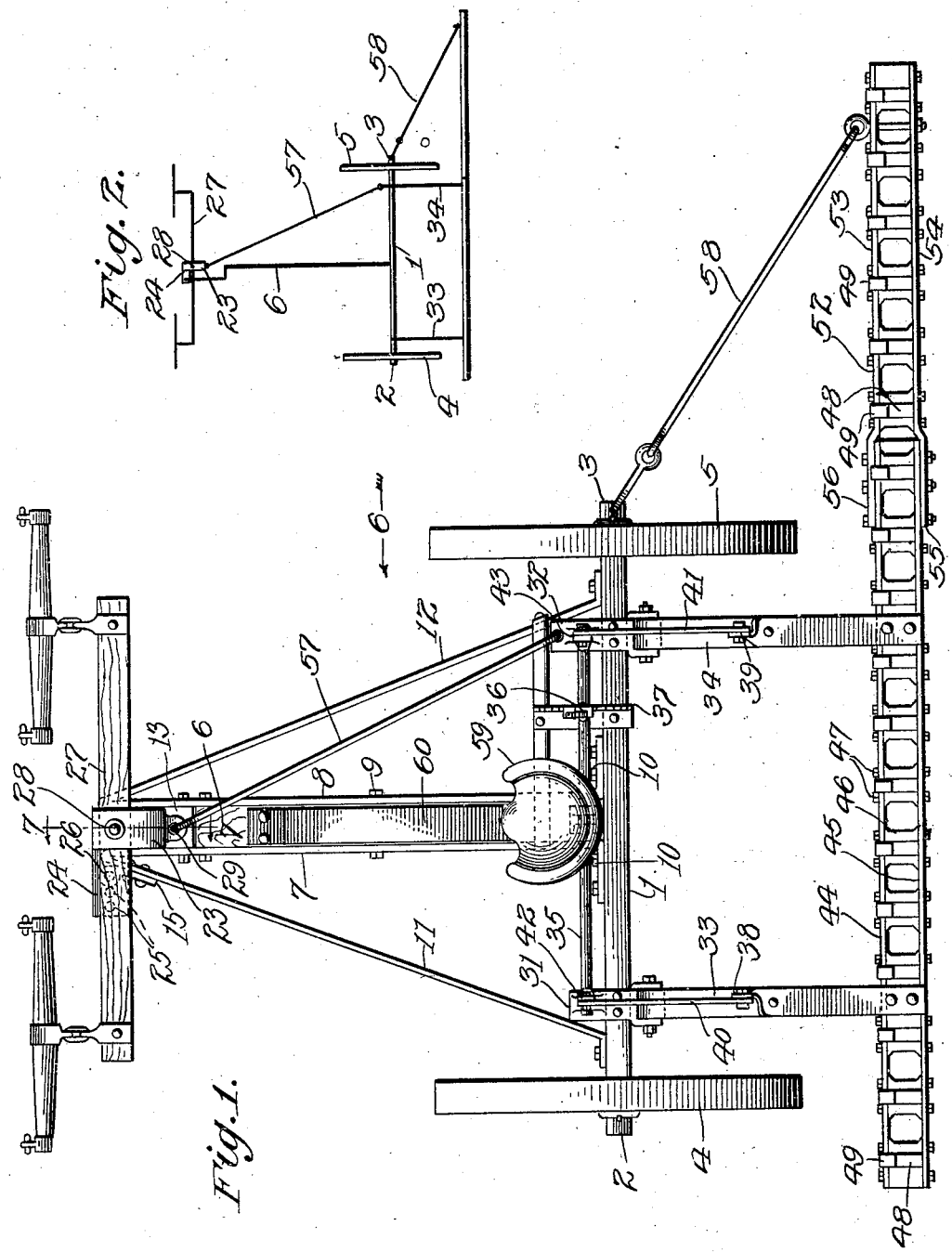

F. E. & J. S. BRADLEY.
CULTIVATOR.
APPLICATION FILED JUNE 30, 1909.
937,760.
Patented Oct. 26, 1909.
3 SHEETS—SHEET 3.
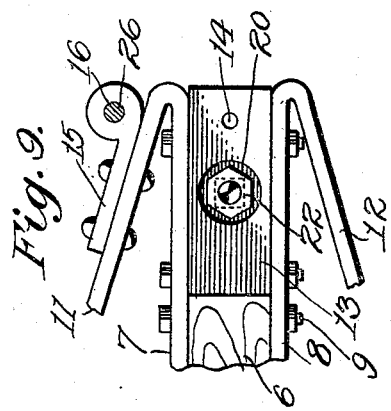
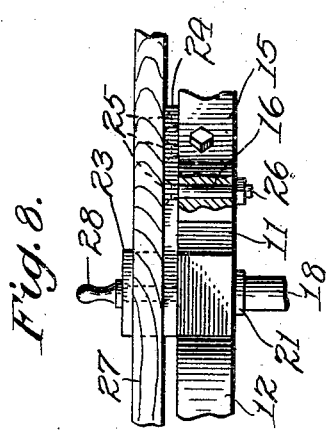
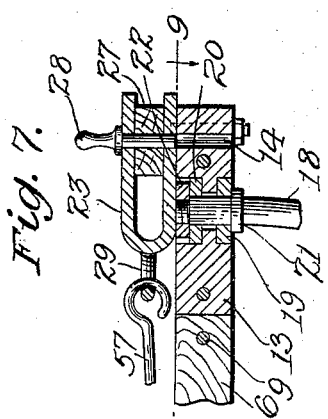
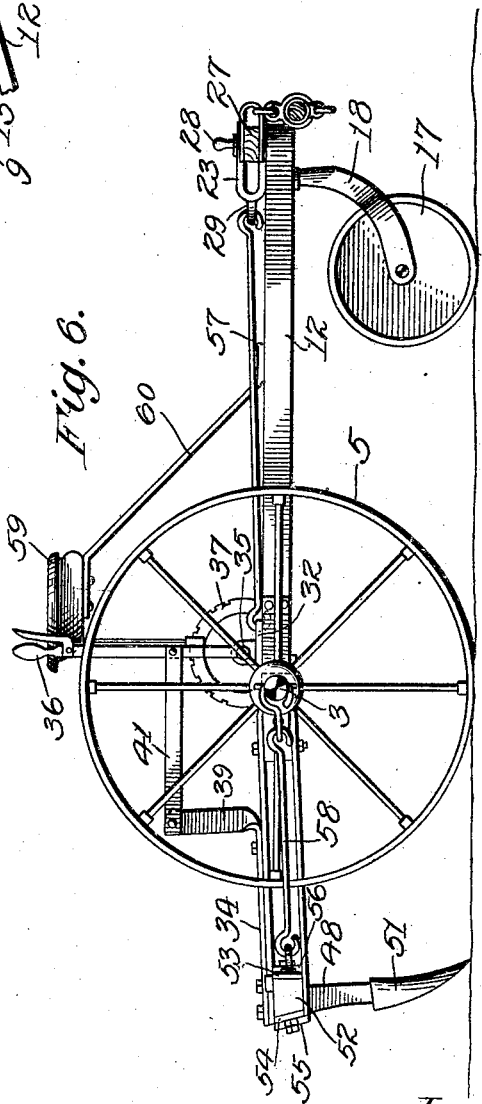
Witnesses:
C. J. Williams
Helen M. Driscoll
Inventors,
Frank E. Bradley
John S. Bradley.
by Semer G. Wells
Attorney.

UNITED STATES PATENT OFFICE.

FRANK E. BRADLEY AND JOHN S. BRADLEY, OF CORONA, CALIFORNIA.

CULTIVATOR.

937,760.           Specification of Letters Patent.      Patented Oct. 26, 1909.

Application filed June 30, 1909. Serial No. 505,253.

*To all whom it may concern:*

Be it known that we, FRANK E. BRADLEY and JOHN S. BRADLEY, citizens of the United States, residing at Corona, California, have invented a new and useful Cultivator, of which the following is a specification.

Primarily our object is to construct a cultivator for use in orange groves and the like, and incidentally to improve the details of construction, and to produce a cultivator which may be used for other purposes.

In the drawings,—Figure 1 is a plan view of a cultivator embodying the principles of our invention, and adapted to reach sidewise from the line of travel of the draft animals so as to reach under orange trees. Fig. 2 is a diagrammatic view of the draft-rigging. Fig. 3 is a plan of the cultivator with the side-reaching attachments removed. Fig. 4 is an enlarged sectional detail of one of the cultivator teeth as seen on the line 4—4 of Fig. 3. Fig. 5 is a sectional detail of a part of the draft-rigging as seen on the line 5—5 of Fig. 3. Fig. 6 is a side-elevation as seen looking in the direction of the arrow 6 in Fig. 1. Fig. 7 is a sectional detail on the line 7—7 of Fig. 1. Fig. 8 is a front elevation of the parts shown in Fig. 7. Fig. 9 is a horizontal section on the line 9—9 of Fig. 7.

Referring to the drawings in detail, the axletree 1 is square and its ends are turned to form the axles 2 and 3 for the traction-wheels 4 and 5. The square timber 6 is placed between the iron straps 7 and 8 and secured by bolts 9 and the rear ends of the straps are bent outwardly and secured to the axletree 1 by bolts 10. The forward ends of the straps are bent outwardly and backwardly to form the braces 11 and 12 and the rear ends of the braces are secured to the ends of the axletree. The bearing block 13 is secured between the forward ends of the straps 7 and 8 and has a clevis-pin opening 14 near its forward end. A second bearing block 15 is secured to the brace 11 and has a pin hole 16 in transverse alinement with the clevis pin opening 14. The caster-wheel 17 has a shank 18 extending through the casting 13 and wheels 19 and 20 are fixed upon the shank said wheels being recessed into the top and bottom of the casting, there being a shoulder 21 upon the shank below the wheels and a nut 22 above the wheels. The clevis 23 has a projection 24, having a series of openings 25 and a pivot-pin 26 is inserted through an opening 25 and the opening 16 so that the clevis may be adjusted laterally. The double-tree 27 is connected to the clevis by the clevis-pin 28. An eye 29 extends backwardly from the clevis. When the pivot-pin 26 is in place a short clevis-pin 28 is used, but when desired the pivot-pin 26 may be omitted and a long clevis pin 30 may be used so as to connect the clevis direct to the casting 13.

Brackets 31 and 32 are secured to the axletree 1 and arms 33 and 34 are hinged to these brackets and extend backwardly. A rock-shaft 35 is mounted in bearings upon the brackets, a tilting-lever 36 is fixed to the shaft and a sector 37 holds the tilting lever in its adjusted position. Arms 38 and 39 extend upwardly from the arms 33 and 34, and links 40 and 41 connect said arms to similar arms 42 and 43 extending upwardly from the rockshaft, so that the arms 33 and 34 are raised and lowered by manipulating the tilting lever 36.

The cultivator-tooth-housing bars 44 and 45 are spaced apart by blocks 46, said blocks being tapered, and said blocks being arranged in pairs and held in place by bolts 47 so as to form housings for the teeth, said housings being wedge-shaped in cross-section as shown in Fig. 4. Each tooth has a shank 48, the forward and rear faces of the shank being parallel with the bars 44 and 45 and keys 49 hold the shanks in place, there being shoulders 50 upon the shanks to engage under the rear bar, so that the shank is held rigidly in place, and so that the teeth are readily removed by driving out the keys 49. Shovels 51 of any desired form may be attached to the shanks 48. The cultivator extension 52 has housing bars 53 and 54 and off-set portions 55 and 56 to overlap the ends of the bars 44 and 45 and long bolts are inserted, so that the extension will reach sidewise as required to reach under orange trees or the like. A draw-bar 57 connects the bracket 32 to the eye 29 and a draw-bar 58 connects the outer end of the extension to the axle 3, so as to equalize the side-draft as much as possible. The extension 52 and the draw-bars 57 and 58 may be omitted, the pin 26 may be removed, and the clevis-pin 30 substituted for the clevis-pin 28.

The seat 59 is mounted upon the spring 60 which is secured to the timber 6.

The parts are so proportioned and located that the load in front of the axletree will overbalance the weight of the cultivator teeth when it is desired to raise the teeth from the ground.

In a companion application for cultivator tooth, filed Aug. 2, 1909, we have shown, described and claimed the cultivator tooth and we do not wish to make such claims herein.

We claim:

1. In a cultivator, an axletree; a square timber extending forwardly from the center of the axletree; iron straps upon each side of the square timber, the rear ends of the straps being bent outwardly and secured to the axletree and the forward ends of the straps being bent outwardly and backwardly and secured to the ends of the axletree; the forward ends of the straps extending beyond the forward end of the square timber; and a bearing-block between the forward ends of the straps and having a clevis-pin opening.

2. In a cultivator, an axletree; a timber extending forwardly from the center of the axletree; iron straps upon each side of the timber, the rear ends of the straps being bent outwardly and secured to the axletree and the forward ends of the straps being bent outwardly and secured to the axletree and the forward ends of the straps being bent outwardly and backwardly and secured to the ends of the axletree; the forward ends of the straps extending beyond the forward end of the timber; a bearing-block between the forward ends of the straps and having a clevis-pin opening; a second bearing-block secured to the outer side of one of the straps and having a pin-hole substantially in transverse alinement with the clevis-pin opening; and a clevis having a perforated projection; so that the projection may be pivoted to the second bearing-block, or the clevis-pin may be inserted through the clevis-pin opening as desired.

3. A bearing-block having a clevis-pin opening; a second bearing-block at one side of the first bearing-block and having a pin-hole; a clevis having a side projection; a pin for insertion through the projection and through the pin-hole; a pin for insertion through the clevis and through the clevis-pin hole; and a draw-bar connected to the clevis.

4. In a cultivator, spacing-blocks, cultivator-tooth-housing bars spaced apart by the spacing-blocks and connecting the blocks together; an axletree; brackets secured to axletree; arms hinged to these brackets and extending backwardly and connected to the cultivator-tooth-housing-bars; a rock-shaft; bearings connecting the bearings to the rock-shaft; a tilting-lever fixed to the rock-shaft; second arms extending upwardly from the first arms; third arms extending upwardly from the rock-shaft; and links connecting the second arms to the third arms; so that the cultivator-tooth-housing-bars may be raised or lowered by manipulating the tilting-lever.

5. In a cultivator, an axletree, wheels for supporting the axletree, cultivator-tooth-housing-bars hingedly connected to the axletree; and cultivator-tooth extension-housing-bars for connection to the first housing-bars.

6. In a cultivator, an axletree; a bearing-block in front of the center of the axletree and having a clevis-pin opening; a second bearing-block at one side of the first bearing-block and having a pin-hole; a clevis having a side projection; a pin for insertion through the projection and through the pin-hole; a pin for insertion through the clevis and through the clevis-pin-hole; wheels for supporting the axletree; cultivator-tooth-housing-bars hingedly connected to the axletree; cultivator-tooth-extension-housing-bars for connection to the first housing-bars; a draw-bar connecting the outer end of the extension-bars to the end of the axletree; and a draw-bar connected to the clevis and to the axletree at a point in front of the complete housing-bars.

FRANK E. BRADLEY.
JOHN S. BRADLEY.

Witnesses:
ESTELLE M. LE SAGE,
HELEN M. DRISCOLL.